(No Model.)
R. HILDEBRAND.
HEDGE TRIMMING MACHINE.
No. 374,964. Patented Dec. 20, 1887.
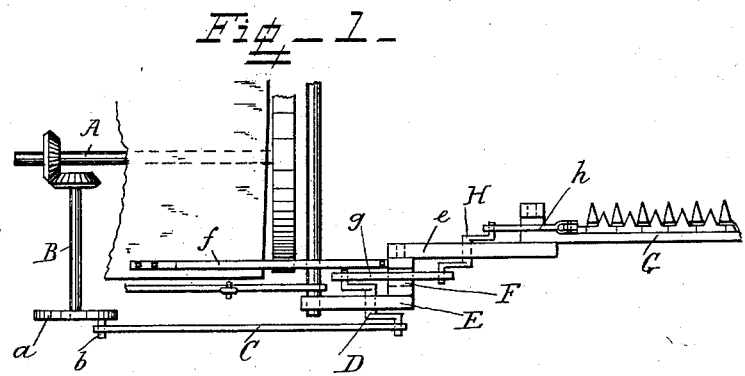
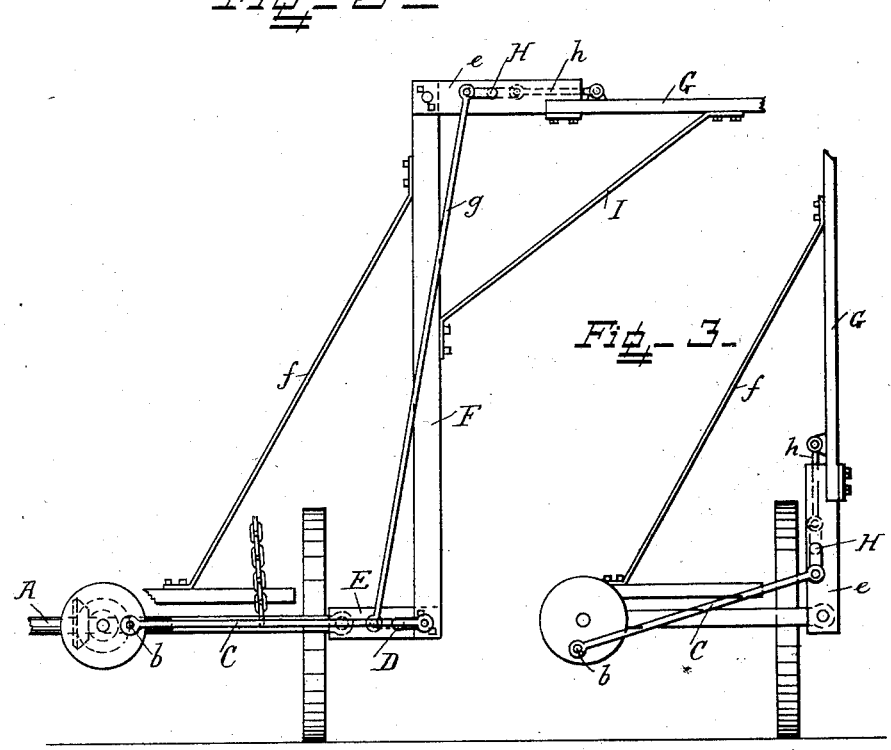
Witnesses
E. Morris.
W. D. Porter.
Inventor
R. Hildebrand.
By his Attorney
Herbert W. T. Jenner.

UNITED STATES PATENT OFFICE.

REINHARD HILDEBRAND, OF BENTON CITY, MISSOURI.

HEDGE-TRIMMING MACHINE.

SPECIFICATION forming part of Letters Patent No. 374,964, dated December 20, 1887.

Application filed January 12, 1887. Serial No. 224,111. (No model.)

*To all whom it may concern:*

Be it known that I, REINHARD HILDEBRAND, a citizen of the United States, residing at Benton City, in the county of Audrain and State of Missouri, have invented certain new and useful Improvements in Hedge-Trimming Machines; and I hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to hedge trimming machines; and it consists in the novel construction and combination of certain interchangeable parts, as hereinafter described, and shown in the drawings, which parts may be applied to any reaping or mowing machine for the purpose of trimming hedges.

In the drawings, Figure 1 is a plan view from above, showing the attachments as applied to a machine for trimming the top of a hedge. Fig. 2 is a side view of the same. Fig. 3 is also a side view, showing the attachment as applied to the machine for trimming the side of a hedge.

A is the main axle of a reaping or mowing machine of any form of construction.

B is a shaft driven from the said axle, as shown, and provided with a disk, $a$, having a crank-pin, $b$, at one end of it.

C is a pitman which connects the crank-pin $b$ with the double crank D, journaled in the extension-bar E, one end of which is connected to the machine in the same manner as the finger-bar is ordinarily connected.

F is a vertical support secured to the extension-piece E. A brace, $f$, connects the vertical support F with the frame of the machine, as shown. To the top of the vertical support F a second extension-piece, $e$, is secured at one end and the opposite end has the finger-bar secured to it.

G is the finger-bar, of ordinary construction.

H is a double crank journaled in the extension-piece $e$. A short pitman-rod, $h$, connects the double crank H with the eye of the cutter-bar, and a long rod, $g$, connects the two double cranks H and D, so that the motion of the crank-pin $b$ is communicated to the cutter-bar, which is moved along on the top of the hedge to be trimmed.

I is a small brace-rod for supporting the finger-bar.

When the side of a hedge is to be trimmed, the vertical support F and extension-piece E are not used. The extension-piece $e$ is attached to the machine in place of the extension-piece E, and the finger-bar is supported in a vertical position by the brace-rod $f$. The crank H is then connected with the crank-pin $b$ by means of the pitman C.

This attachment is cheap and simple to construct, and can be applied in a very short time without any skilled labor to any mowing or reaping machine. It can be changed from a horizontal to a vertical cutter, or the reverse, in a very short space of time. No extra special parts or additions have to be made to the attachments when used for cutting the side of the hedge, as all of them are used in cutting the top of the hedge.

The various attachments can be made of wood or iron, or both, and may be varied in form to suit different mowing or reaping machines, the same principle of interchangeable attachments for horizontal and vertical cutting being adhered to.

What I claim is—

1. A hedge-cutting attachment for a reaping or mowing machine, comprising the crank-pin $b$, driven by intermediate gearing from the main axle, the vertical support F and means for attaching it to the frame, the finger-bar G and means for attaching it to the said vertical support in a horizontal position, the double crank H and rod $h$, for operating the cutter-bar, the rod C, connected to the said crank-pin and operating the said crank H through the intermediate mechanism for connecting the said rod with the double crank, consisting of the rod $g$, and the double crank D, substantially as set forth.

2. A hedge-cutting attachment for a reaping or mowing machine, comprising the crank-pin b, driven from the main axle, the extension-bar E, connected to the machine, the rod C, the double crank D, the vertical support F, connected to the bar E, the brace f, supporting the said support, the extension-piece e, secured to the said support, the horizontal finger-bar connected to piece e, the double crank H, the short rod h, the long rod g, and the brace I, supporting the finger-bar from the vertical support F, substantially as shown and set forth.

In testimony whereof I affix my signature in presence of two witnesses.

REINHARD HILDEBRAND.

Witnesses:
F. C. BRYAN,
S. W. BICKLEY.